(12) United States Patent
Albou et al.

(10) Patent No.: US 9,283,903 B2
(45) Date of Patent: Mar. 15, 2016

(54) HEADLAMP OR TAIL LAMP HAVING A VISIBLE ELEMENT ADAPTED TO PRESENT A PREDETERMINED APPEARANCE

(71) Applicant: Valeo Vision, Bobigny (FR)

(72) Inventors: Pierre Albou, Paris (FR); Jean-Claude Puente, Livry Gargan (FR)

(73) Assignee: Valeo Vision, Bobigny (FR)

(*) Notice: Subject to any disclaimer, the term of this patent is extended or adjusted under 35 U.S.C. 154(b) by 51 days.

(21) Appl. No.: 14/167,275

(22) Filed: Jan. 29, 2014

(65) Prior Publication Data

US 2014/0214272 A1 Jul. 31, 2014

(30) Foreign Application Priority Data

Jan. 31, 2013 (FR) ...................................... 13 50844

(51) Int. Cl.
*B60R 13/04* (2006.01)
*F21S 8/10* (2006.01)

(52) U.S. Cl.
CPC ............... *B60R 13/04* (2013.01); *F21S 48/145* (2013.01); *F21S 48/1731* (2013.01)

(58) Field of Classification Search
None
See application file for complete search history.

(56) References Cited

U.S. PATENT DOCUMENTS

| | | | |
|---|---|---|---|
| 4,872,745 A * | 10/1989 | Fujisawa et al. ............... | 362/510 |
| 4,875,141 A | 10/1989 | Miyauchi et al. | |
| 5,220,317 A * | 6/1993 | Lynam et al. ................. | 345/105 |
| 5,517,389 A * | 5/1996 | Myers ................. | F21S 48/1731 362/214 |
| 5,672,001 A | 9/1997 | Bertling et al. | |
| 6,491,416 B1 * | 12/2002 | Strazzanti ...................... | 362/512 |
| 7,081,888 B2 * | 7/2006 | Cok et al. ....................... | 345/173 |
| 7,224,324 B2 * | 5/2007 | Quist et al. ..................... | 359/267 |
| 8,256,940 B2 * | 9/2012 | Brown et al. .................... | 701/36 |
| 2003/0202357 A1 * | 10/2003 | Strazzanti ........... | F21S 48/1731 362/509 |
| 2008/0198372 A1 | 8/2008 | Pan | |
| 2009/0027759 A1 * | 1/2009 | Albahri ......................... | 359/277 |
| 2011/0029194 A1 * | 2/2011 | Brown ................ | F21S 48/1731 701/36 |
| 2013/0077153 A1 * | 3/2013 | Albou ..................... | F21S 48/15 359/296 |
| 2013/0279014 A1 * | 10/2013 | Fish et al. ...................... | 359/630 |

FOREIGN PATENT DOCUMENTS

| | | |
|---|---|---|
| DE | 3743137 | 6/1988 |
| DE | 4436620 | 4/1996 |
| DE | 19728956 | 1/1999 |
| FR | 2805885 | 9/2001 |

* cited by examiner

*Primary Examiner* — Rami Khatib
*Assistant Examiner* — David Merlino
(74) *Attorney, Agent, or Firm* — Jacox, Meckstroth & Jenkins

(57) ABSTRACT

A visible element that is at least partially visible from an outside of a motor vehicle. The visible element is a part of either a lighting and/or signaling device and is capable of presenting at least a first appearance or a second appearance. The first and second appearances being able to remain in the absence of electrical energy. The visible element being arranged to provoke the transition from the first appearance to the second appearance in response to a command. The visible element has an actuator arranged to send the command to provoke the transition between the first appearance and the second appearance, with the actuator being able to be used, in normal usage, outside the motor vehicle. The visible element may be energized to change the appearance of the headlamp or the tail lamp assembly.

19 Claims, 2 Drawing Sheets

HEADLAMP OR TAIL LAMP HAVING A VISIBLE ELEMENT ADAPTED TO PRESENT A PREDETERMINED APPEARANCE

CROSS-REFERENCE TO RELATED APPLICATIONS

This application claims priority to French Application No. 1350844 filed Jan. 31, 2013.

BACKGROUND OF THE INVENTION

1. Field of the Invention

The invention relates notably to an assembly for a motor vehicle.

2. Description of the Related Art

Personalization of motor vehicles is an aspect which is of increasing importance among vehicle users. It is, for example, commonplace to configure the aesthetic appearance of the vehicle before purchasing the latter. This solution does, however, present the drawback of being permanent throughout the life of the vehicle.

Now, there is a need to enable the user to adapt this esthetic appearance according to his or her requirements.

Parts for vehicles are also known which are capable of being configured at the time of purchase to present an original appearance. However, these devices require an electrical power supply for this appearance to remain, which implies energy consumption drawbacks. Furthermore, such parts are not reconfigurable once installed on the vehicle and require intervention by a professional to be able to be configured.

The invention notably aims to mitigate the abovementioned problems.

SUMMARY OF THE INVENTION

Thus, the subject of the invention is an assembly for a motor vehicle, this assembly comprising at least:
one visible element at least partially visible from the outside of the vehicle when this visible element is installed on the vehicle, this visible element being able to present selectively at least first and second appearances, these first and second appearances being able to remain in the absence of the input of energy, notably of electrical energy, to this visible element, this visible element being arranged to provoke the transition from the first appearance to the second appearance in response to a command; and
one actuator arranged to send the command to provoke the transition from the first appearance to the second appearance of the visible element, this actuator being able to be used, in normal usage, outside the vehicle.

The actuator can thus be used without the user having to introduce a part of his or her body, such as his or her arm, into the vehicle passenger compartment.

By virtue of the invention, it is thus possible to order the change of appearance of a visible element of the vehicle from outside the passenger compartment of this vehicle, the appearance remaining in the absence of the input of energy, for example in the absence of an electrical power supply. It is notably possible to order the change of appearance without the intervention of a professional and after the element has been installed on the vehicle.

Advantageously, the transition from the first appearance to the second appearance is produced without the addition of material.

Also advantageously, the change of appearance of the visible element is produced without the movement of this visible element relative to the vehicle when the visible element is installed on the vehicle.

Preferentially, the transition from the first appearance to the second appearance is reversible. This feature notably offers the user the advantage of being able to modify the appearance of the element as many times as he or she desires.

In an exemplary implementation of the invention, the visible element has a surface at least partially visible from the outside of the vehicle when this visible element is installed on the vehicle, the first and second appearances corresponding to two different appearances of this surface.

For example, provision can be made for the surface of the element to be sub-divided into a plurality of surface elements. If appropriate, these surface elements are all able to change appearance, the change of appearance of the visible element being produced by the change of appearance of at least one of these surface elements. In this way, the user can choose to produce a plurality of patterns on the visible element.

If so desired, the surface elements are arranged in rows and in columns. In this case, it is possible easily to produce patterns by addressing the surface elements in the manner of pixels of a screen.

In an exemplary implementation of the invention, the surface element is formed on a multilayer structure, this multilayer structure comprising at least one electrosensitive layer comprising a material sensitive to an electrical current, this material changing appearance when the electrical current is applied to this material so as to participate in the transition from the first appearance to the second appearance of the surface element.

For example, the sensitive material can be an electrochromic material, for example of the tungsten trioxide or titanium dioxide or even niobium pentoxide type.

As a variant, the sensitive material can be an electronic ink.

These features offer the advantage of being able to easily and simply install the sensitive material on the vehicle, for example by painting, electrolysis or even gluing.

Advantageously, the multilayer structure comprises at least one electrode-forming first layer associated with the surface element of the multilayer structure, this electrode being arranged against the electrosensitive layer so as to be able to apply an electrical current to this electrosensitive layer.

Provision can be made for the electrode-forming first layer to be produced in a transparent material, notably produced in indium tin oxide (ITO).

If appropriate, the multilayer structure can comprise an electrode-forming second layer associated with the surface element of the multilayer structure, the electrosensitive layer being arranged between the electrode-forming first and second layers.

In an exemplary embodiment of the invention, the visible element comprises at least one electrical energy source electrically connected to at least one multilayer structure, this electrical energy source being capable of generating an electrical current in response to the command to provoke the change of appearance of the surface element of the multilayer structure.

Preferentially, the visible element comprises an electrical writing circuit electrically linked on the one hand to the electrical energy source and on the other hand to the electrode-forming first and/or second layers of at least one multilayer structure, this writing circuit being arranged to transmit, according to the command, the electrical current generated by the energy source to the electrode-forming first and/or second layers to provoke the change of appearance of the surface element of the multilayer structure. It is thus possible to easily produce patterns on the visible element.

If so desired, the multilayer structure can be flexible.

For example, the visible element is able to form part of a body of the motor vehicle.

As a variant, the visible element is able to form part of a window of the motor vehicle. This feature offers the advantage of being able, for example, to render the window of the vehicle opaque.

Also as a variant, the visible element is able to form part of a lighting and/or signaling device of the motor vehicle. If appropriate, the visible element can be able to form part of a piece of this lighting and/or signaling device, this piece being chosen from:

a mask,
an outer lens,
a lens,
a housing,
a trim.

In this case, it is notably possible to produce aesthetic patterns on the visible element of the lighting and/or signaling device. It is also possible to make a part of the outer lens opaque so as to produce a dark zone in the light beam produced by the lighting and/or signaling device, for example, to produce a regulatory photometric function.

In an exemplary embodiment of the invention, the actuator is arranged to be installed permanently on the vehicle.

For example, the actuator can be installed on the visible element.

As a variant, the actuator is arranged at a non-zero distance from the visible element.

Preferentially, the actuator is produced on a touch-sensitive zone of the body of the vehicle in such a way that, when a pressure is applied to this zone, the command is sent to the visible element to order the transition from the first appearance to the second appearance.

If appropriate, the actuator can be produced on a touch-sensitive zone of a window, notably of an outer lens of a lighting and/or signaling device, of the motor vehicle.

The actuator can comprise at least one pressure/strain gauge, this pressure gauge exhibiting an electrical resistance likely to be modified when a pressure is applied at least one point of the touch-sensitive zone.

In this case, the gauge can be arranged at least partially in the thickness of the window including the touch-sensitive zone. This feature offers the advantage of not adding bulk to the vehicle.

As a variant, the gauge is arranged against the window including the touch-sensitive zone, the gauge being arranged toward the interior side of the vehicle. The gauge is thus protected by the window.

Advantageously, the actuator comprises four pressure gauges, these pressure gauges being arranged at the four corners of the window including the touch-sensitive zone.

If appropriate, the actuator can include a microprocessor arranged to detect a change of the electrical resistance of the pressure gauge.

Preferentially, the actuator is arranged to generate the command when it detects a change of electrical resistance and to send this command to the visible element.

Optionally, the microprocessor can be arranged to determine coordinates, in a given reference frame, of the point of the surface of the actuator to which the pressure has been applied, these coordinates forming part of the command. This feature offers the advantage of being able to accurately determine the position of a member, notably of a finger, pressing on the surface of the actuator, for example to determine a movement of this member.

In an exemplary embodiment of the invention, the actuator is arranged to generate and send the command only when the microprocessor detects a predetermined actuator unlocking code, this code notably being able to be implemented on the touch-sensitive zone.

This feature notably makes it possible to avoid having the change of appearance of the visible element occur in an untimely manner, for example, when a piece of gravel or a leaf strikes the touch-sensitive zone.

If appropriate, this predetermined unlocking code can be a predetermined movement of a pressure applied to the touch-sensitive zone or even a predetermined number of pressures applied simultaneously to the touch-sensitive zone.

In an exemplary embodiment of the invention, the transition from the first appearance to the second appearance of the visible element corresponds to the change of at least one of the characteristics of the following visible element:

transparency,
translucency,
opacity,
change of image,
change of texture.

Optionally, the visible element is arranged in such a way as to present predetermined appearances.

If appropriate, each predetermined appearance is associated with an appearance code. In this case, the actuator can be arranged to generate and send the command provoking the change of appearance to a predetermined appearance only when the microprocessor detects the code associated with this predetermined appearance, this code notably being able to be implemented on the touch-sensitive zone.

As a variant, the visible element and the actuator are arranged in such a way that the transition from the first appearance to the second appearance of the visible element corresponds to the production of a pattern on the visible element, this pattern being identical to the one produced by the movement of a pressure applied to the touch-sensitive zone.

These and other objects and advantages of the invention will be apparent from the following description, the accompanying drawings and the appended claims.

The invention will be able to be better understood on reading the following detailed description of nonlimiting exemplary implementations of the invention, and on studying the appended drawing, in which:

BRIEF DESCRIPTION OF THE ACCOMPANYING DRAWINGS

DETAILED DESCRIPTION OF THE PREFERRED EMBODIMENTS

Figure 1:
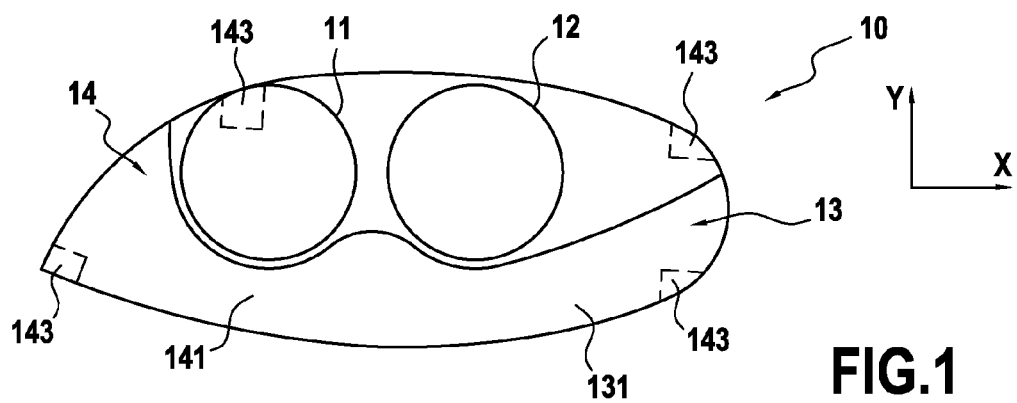
FIG. 1 represents, schematically and partially, a front view of an assembly comprising a visible element having a first appearance according to an exemplary implementation of the invention.
Figure 2:
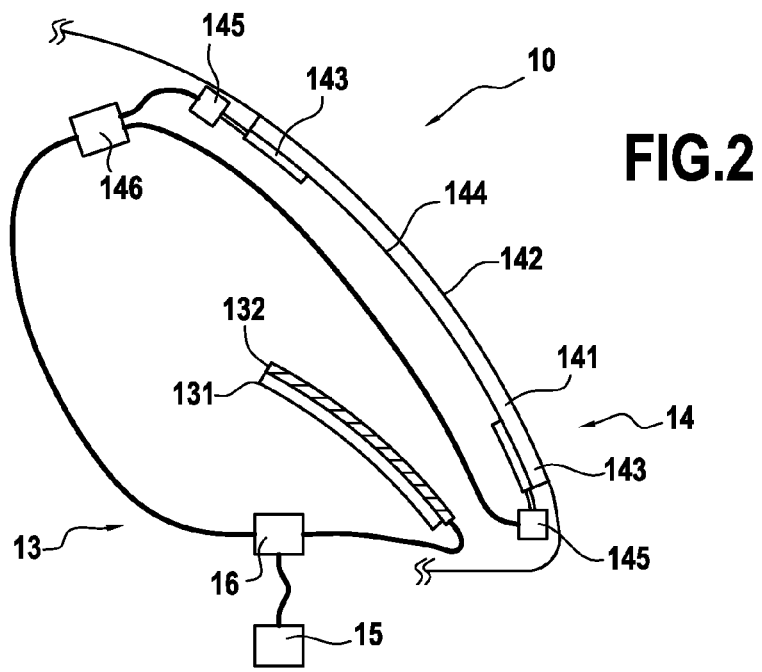
FIG. 2 represents, schematically and partially, a cross-sectional view of the assembly of FIG. 1.

FIGS. 1 and 2 show an assembly 10 in the form of a lighting device installed on a motor vehicle, which is not represented.

The device 10 comprises two lighting and/or signaling modules 11 and 12 and a visible element 13 comprising a mask 131.

The mask 131 makes it possible to mask means, not represented, for electrically connecting or fastening the modules 11 and 12 to the motor vehicle.

The device 10 also comprises an actuator 14 comprising an outer lens 141 of the device 10, the actuator 14 being arranged to send a command to provoke the transition from a first appearance to a second appearance of the mask 131.

The outer surface 142 of the outer lens 141 comprises, over its entire surface, a touch-sensitive zone arranged in such a way that, when a pressure is applied to this surface 142, the command is sent to the visible element 13 to order the transition from the first appearance to the second appearance.

The actuator 14 can thus be used, in normal usage, from outside the vehicle, that is to say without the user having to introduce a part of his or her body, such as his or her arm, into the vehicle passenger compartment.

The actuator 14 comprises four pressure/strain gauges 143, these pressure gauges 143 exhibiting an electrical resistance likely to be modified when a pressure is applied at least one point of the outer surface 142.

The gauges 143 are glued against the internal surface 144 of the outer lens 141.

The actuator comprises four signal processing circuits 145, comprising, in a nonlimiting manner, a filter and an amplifier, each circuit 145 being connected to a gauge 143. Each circuit 145 is arranged in such a way as to transform a change of resistance of the gauge 143 into a clear and standardized electrical signal.

The actuator comprises a microprocessor 146, connected to the four circuits 145, this microprocessor 146 being arranged to detect a change of the electrical resistance of the pressure gauge, to generate the command provoking a change of appearance when a change of electrical resistance is detected and to send this command to the visible element 13.

The microprocessor 146 is arranged to determine coordinates, in an XY reference frame, of the point of the outer surface 142 to which the pressure has been applied.

The microprocessor 146 comprises a memory, not represented, this memory containing a coding table associating a unique appearance code with one or more predetermined appearances. The microprocessor 146 is arranged to generate and send the command provoking the change of appearance to a predetermined appearance only when it detects the code associated with this predetermined appearance, this code being able to be, for example, the coordinates of a predetermined movement of a pressure applied to the outer surface 142.

The surface 132 of the mask 131 is visible from outside the device.

Figure 3:
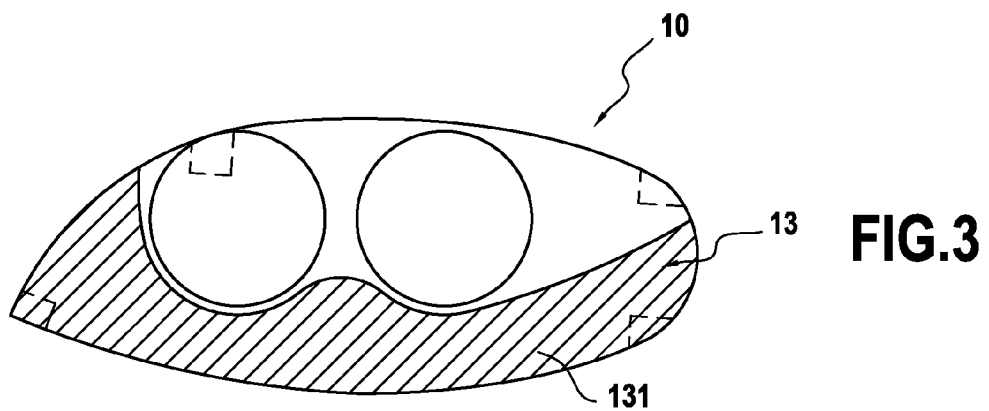
FIG. 3 represents, schematically and partially, a front view of the assembly of FIG. 1 when the visible element presents a second appearance.

In a nonlimiting manner, the surface 132 can present, selectively, in response to the command provoking the change of appearance:
- a first appearance, for example a white appearance, which remains in the absence of the input of electrical energy to the mask 131.
- a second appearance, for example, an opaque appearance, as illustrated in FIG. 3, which remains also in the absence of the input of electrical energy to the mask 131.

The surface 132 may also present, selectively, other appearances not represented such as transparency, translucency, a texture or even an image.

The transition from one appearance to another appearance is reversible.

Figure 4:
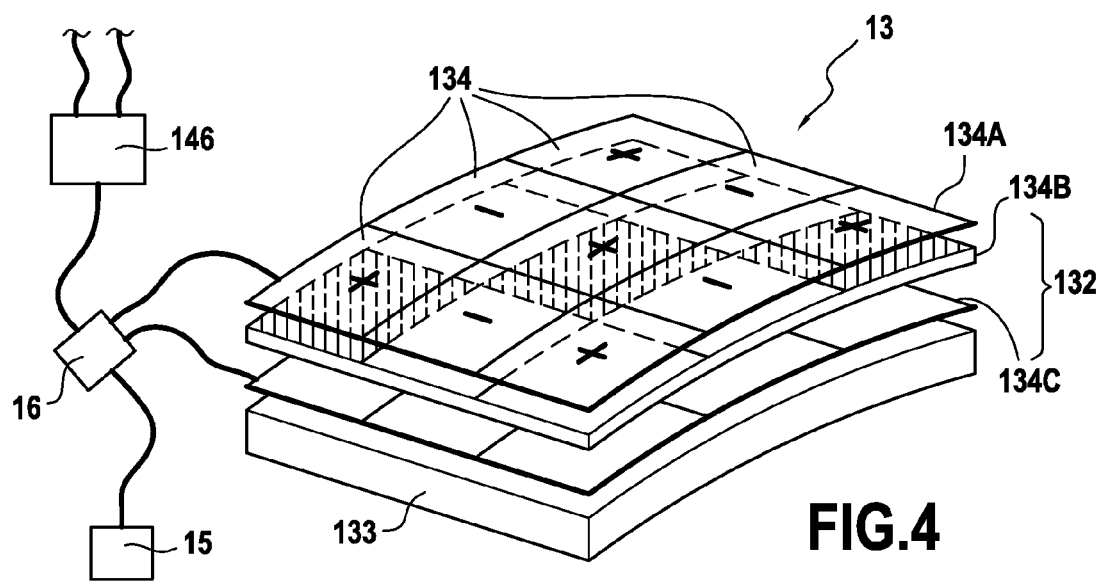
FIG. 4 represents, schematically and partially, a perspective view of the visible element of the assembly of FIG. 1.

FIG. 4 represents a perspective view of the mask 131 of the device 10.

The mask 131 comprises a substrate 133, for example produced in PC or in PMMA, on which the surface 132 is deposited.

The surface 132 of the mask 131 is sub-divided into a plurality of surface elements 134. These surface elements 134 are all able to change appearance, the change of appearance of the mask 131 being produced by the change of appearance of at least one of these surface elements 134.

The surface elements 134 are arranged in rows and in columns so as to be addressable.

Each surface element 134 is formed on a multilayer structure comprising:
- a first electrode 134A associated with the surface element 134,
- an electrosensitive layer 134B, and
- a second electrode 134C associated with the surface element 134.

The first electrode 134A is produced in a transparent material, notably produced in indium tin oxide (ITO).

The electrosensitive layer 134B is produced in a material sensitive to an electrical current, for example, an electronic ink, this material changing appearance when the electrical current is applied to this material so as to participate in the transition from the first appearance to the second appearance of the surface element 134.

The electrosensitive layer 134B is arranged between the first electrode 134A and the second electrode 134C in such a way that an electrical current can be applied to it.

The visible element 13 comprises an electrical energy source 15, this electrical energy source 15 being capable of generating an electrical current in response to the command provoking the change of appearance.

The device 10 comprises an electrical writing circuit 16 powered electrically by the electrical energy source 15 and connected to the microprocessor 146 and to the electrodes 134A and 134C of the surface elements 134.

The writing circuit 16 is arranged to transmit, according to the command provoking the change of appearance of one or more predetermined surface elements 134, an electrical current generated by the source 15 to the electrodes 134A and 134C of the predetermined surface elements 134 to provoke the change of appearance of these surface elements 134.

Figure 5:
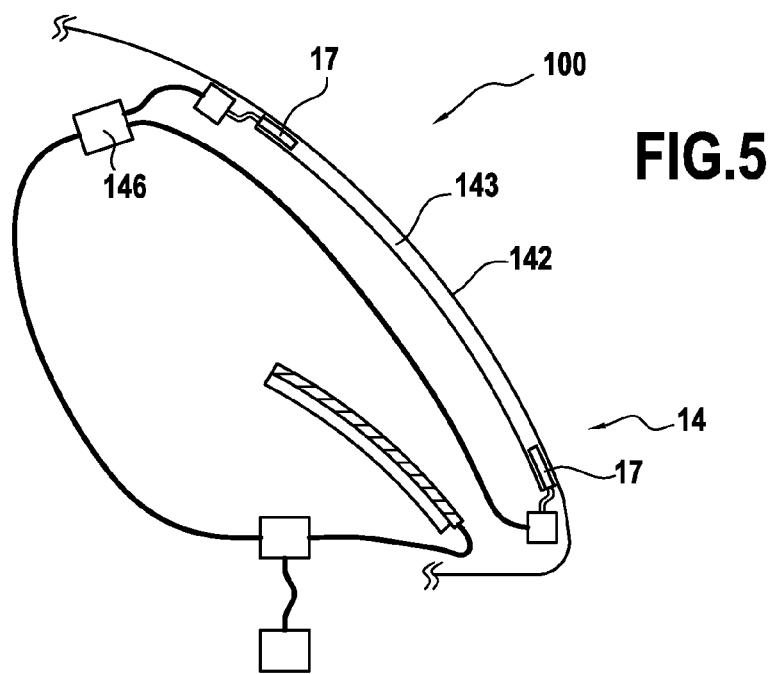
FIG. 5 represents, schematically and partially, a cross-sectional view of an assembly according to another exemplary implementation of the invention.

FIG. 5 represents an assembly 100 according to the invention, this assembly 100 being similar to that of FIG. 2 apart from the pressure/strain gauges.

The actuator 14 comprises four pressure/strain gauges 17, these pressure gauges 17 exhibiting an electrical resistance likely to be modified when a pressure is applied at at least one point of the outer surface 142.

The gauges 17 are arranged in the thickness of the outer lens 141.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An assembly for a motor vehicle, this assembly comprising at least:
   a visible element at least partially visible from an outside of the motor vehicle when said visible element is installed on the motor vehicle, said visible element being able to present selectively at least a first appearance and a second appearance, said first and second appearances being able to remain in the absence of electrical energy to said visible element, said visible element being arranged to provoke a transition from said first appearance to said second appearance in response to a command; and
   an actuator arranged to send a command to provoke said transition from said first appearance to said second appearance of said visible element, said actuator being able to be used, in normal usage, outside a passenger compartment of the motor vehicle;
   wherein said visible element is part of at least one of a lighting device or a turning or braking signaling device of the motor vehicle, said at least one of said lighting device or said turning or braking signaling device being at least one of a headlamp or a tail lamp; and
   wherein said visible element forms at least part of said at least one of said lighting device or said turning or braking signaling device, said part being at least one of a mask, an outer lens, a lens, a housing or a trim.

2. The assembly according to claim 1, wherein said transition from said first appearance to said second appearance is reversible.

3. The assembly according to claim 1, wherein said visible element has a surface at least partially visible from said outside of the motor vehicle when said visible element is installed on the motor vehicle, said first and second appearances corresponding to two different appearances of said surface.

4. The assembly according to claim 3, wherein said surface is sub-divided into a plurality of surface elements, said plurality of surface elements all being able to change appearance, the change of appearance of said visible element being produced by a change of appearance of at least one of said plurality of surface elements.

5. The assembly according to claim 4, wherein said plurality of surface elements are arranged in rows and in columns.

6. The assembly according to claim 4, wherein said plurality of surface elements is formed on a multilayer structure, said multilayer structure comprising at least one electrosensitive layer comprising a material sensitive to an electrical current, said material changing appearance when said electrical current is applied to said material so as to participate in the transition from said first appearance to said second appearance of said plurality of surface elements.

7. The assembly according to claim 6, wherein said sensitive material is an electrochromic material.

8. The assembly according to claim 7, wherein said sensitive material is an electronic ink.

9. The assembly according to claim 6, wherein said multilayer structure comprises at least one electrode-forming first layer associated with said plurality of surface elements of said multilayer structure, said at least one electrode-forming first layer being arranged against said at least one electrosensitive layer so as to be able to apply an electrical current to said at least one electrosensitive layer.

10. The assembly according to claim 9, wherein said at least one electrode-forming first layer is produced in a transparent material.

11. The assembly according to claim 6, wherein said visible element comprises at least one electrical energy source electrically connected to at least one multilayer structure, said at least one electrical energy source being capable of generating an electrical current in response to a command to provoke a change of appearance of said plurality of surface elements of said multilayer structure.

12. The assembly according to claim 6, wherein said multilayer structure is flexible.

13. The assembly according to claim 1, wherein said actuator is installed on said visible element.

14. The assembly according to claim 13, wherein said actuator is produced on a touch-sensitive zone of a window, notably of an outer lens of a lighting and/or signaling device, of the motor vehicle.

15. The assembly according to claim 14, wherein said actuator comprises at least one pressure/strain gauge, said at least one pressure/strain gauge exhibiting an electrical resistance likely to be modified when a pressure is applied at least one point of said touch-sensitive zone.

16. The assembly according to claim 14, wherein said at least one pressure/strain gauge is arranged at least partially in a thickness of a window including said touch-sensitive zone.

17. The assembly according to claim 14, wherein said at least one pressure/strain gauge is arranged against a window including said touch-sensitive zone, said at least one pressure/strain gauge being arranged toward an interior side of the motor vehicle.

18. The assembly according to claim 14, wherein said visible element and said actuator are arranged in such a way that a transition from said first appearance to said second appearance of said visible element corresponds to a production of a pattern on said visible element, said pattern being identical to a movement of a pressure applied to said touch-sensitive zone.

19. The assembly according to claim 1, wherein transition from said first appearance to said second appearance of said visible element corresponds to a change of at least one of the characteristics of the following visible element:
   transparency,
   translucency,
   opacity,
   change of image,
   change of texture.

* * * * *